(12) United States Patent
Yoshida et al.

(10) Patent No.: US 10,988,914 B2
(45) Date of Patent: Apr. 27, 2021

(54) HYBRID WORK MACHINE

(71) Applicant: Hitachi Construction Machinery Tierra Co., Ltd., Koka (JP)

(72) Inventors: Hajime Yoshida, Omihachiman (JP); Shuuhei Noguchi, Higashiomi (JP); Motoaki Ishii, Koka (JP)

(73) Assignee: Hitachi Construction Machinery Tierra Co., Ltd, Koka (JP)

( * ) Notice: Subject to any disclaimer, the term of this patent is extended or adjusted under 35 U.S.C. 154(b) by 179 days.

(21) Appl. No.: 16/080,978

(22) PCT Filed: Sep. 16, 2016

(86) PCT No.: PCT/JP2016/077565
§ 371 (c)(1),
(2) Date: Aug. 29, 2018

(87) PCT Pub. No.: WO2018/051510
PCT Pub. Date: Mar. 22, 2018

(65) Prior Publication Data
US 2019/0024342 A1   Jan. 24, 2019

(51) Int. Cl.
*E02F 9/20* (2006.01)
*B60K 6/485* (2007.10)
(Continued)

(52) U.S. Cl.
CPC ............ *E02F 9/2091* (2013.01); *B60K 6/485* (2013.01); *B60W 10/06* (2013.01); *B60W 10/08* (2013.01);
(Continued)

(58) Field of Classification Search
CPC ......... E02F 9/2091; E02F 9/00; E02F 9/2075; E02F 3/325; B60W 20/00; B60W 50/082;
(Continued)

(56) References Cited

U.S. PATENT DOCUMENTS

2014/0214250 A1* 7/2014 Murakami ............. B60L 58/10
701/22
2015/0299985 A1* 10/2015 Takehara ............. E02F 9/2075
701/22
2016/0265195 A1 9/2016 Imura et al.

FOREIGN PATENT DOCUMENTS

JP   2001-3779 A   1/2001
JP   2004150306 A * 5/2004
(Continued)

OTHER PUBLICATIONS

Machine Translation of JP2011149226 (Yoshida) (Year: 2011).*
(Continued)

*Primary Examiner* — Navid Ziaeianmehdizadeh
(74) *Attorney, Agent, or Firm* — Crowell & Moring LLP

(57) ABSTRACT

To achieve saving of fuel consumption and noise reduction by adopting a hybrid type and miniaturizing an engine and to ensure safe and reliable battery charging in a case in which a charge amount of a battery is quite insufficient, a hydraulic work machine includes: a gate lock sensor (28); a forced charging switch (41); a work machine monitor (43) that notifies an operator that a charging rate of a battery (33) falls to be lower than a critical charging rate; and a machine controller (46). The machine controller (46) actuates a generator motor (31) as a generator to forcedly charge the battery (33) when a gate lock lever (26) is operated to a lock position (D), an engine control dial (12) designates a low idle engine speed, and the forced charging switch (41) is operated.

5 Claims, 10 Drawing Sheets

(51) Int. Cl.
*B60W 10/06* (2006.01)
*B60W 10/08* (2006.01)
*E02F 9/00* (2006.01)
*B60W 50/14* (2020.01)
*B60W 50/08* (2020.01)
*B60W 20/00* (2016.01)
*B60W 20/13* (2016.01)
*B60W 20/17* (2016.01)
*B60W 10/26* (2006.01)
*B60W 10/30* (2006.01)

(52) U.S. Cl.
CPC ............ *B60W 10/26* (2013.01); *B60W 10/30* (2013.01); *B60W 20/00* (2013.01); *B60W 20/13* (2016.01); *B60W 20/17* (2016.01); *B60W 50/082* (2013.01); *B60W 50/14* (2013.01); *E02F 9/00* (2013.01); *B60W 2050/146* (2013.01); *B60W 2510/0638* (2013.01); *B60W 2510/244* (2013.01); *B60W 2530/145* (2013.01); *B60W 2710/0644* (2013.01); *B60W 2710/0666* (2013.01); *Y02T 10/62* (2013.01)

(58) Field of Classification Search
CPC ...... B60W 50/14; B60W 10/30; B60W 10/26; B60W 20/17; B60W 20/13; B60W 10/08; B60W 10/06; B60W 2050/146; B60W 2710/0644; B60W 2510/244; B60W 2710/0666; B60W 2530/145; B60W 2510/0638; B60W 2300/17; B60K 6/485; Y02T 10/6226; Y02T 10/6286
See application file for complete search history.

(56) References Cited

FOREIGN PATENT DOCUMENTS

| | | | |
|---|---|---|---|
| JP | 2005-138751 A | | 6/2005 |
| JP | 2011149226 A | * | 8/2011 |
| JP | 2013-23945 A | | 2/2013 |
| JP | 2015-206193 A | | 11/2015 |
| JP | 2016-160661 A | | 9/2016 |
| JP | 2016-160662 A | | 9/2016 |
| JP | 2016-165985 A | | 9/2016 |

OTHER PUBLICATIONS

Machine Translation of JP-2013023945-A (Magaki) corresponding to the IDS dated Aug. 29, 2018 (Year: 2013).*
Machine Translation of JP2004150306A (Ito) (Year: 2004).*
International Search Report (PCT/ISA/210) issued in PCT Application No. PCT/JP2016/077565 dated Nov. 15, 2016 with English translation (six pages).
Japanese-language Written Opinion (PCT/ISA/237) issued in PCT Application No. PCT/JP2016/077565 dated Nov. 15, 2016 (five pages).
International Preliminary Report on Patentability (PCT/IB/338 & PCT/IB/373) issued in PCT Application No. PCT/JP2016/077565 dated Mar. 28, 2019, including English translation of document C2 (Japanese-language Written Opinion (PCT/ISA/237) previously filed on Aug. 29, 2018) (nine (9 pages).

* cited by examiner $$\text{FUEL CONSUMPTION g/kWh} = \frac{\text{AMOUNT OF FUEL CONSUMPTION g/h}}{\text{ELECTRICITY GENERATED kW}}$$

HYBRID WORK MACHINE

TECHNICAL FIELD

The present invention relates to a hybrid work machine and particularly relates to a small-sized hydraulic excavator as a hybrid work machine.

BACKGROUND ART

In recent years, hybrid work machines using both an engine (diesel engine) and an electric motor have been developed and partially put into practical use as work machines such as hydraulic excavators from the viewpoint of saving of fuel consumption, improvement in exhaust gas emission characteristics, noise reduction, and the like. As such a hybrid construction machine, there is known, for example, a hybrid construction machine disclosed in Patent Document 1.

The hybrid construction machine disclosed in Patent Document 1 is equipped with a generator motor as an auxiliary power source of a hydraulic pump driven by an engine, and configured such that in a case in which a charge amount of a battery falls to be equal to or lower than a preset charging rate, then a target engine speed is reduced to increase an output power torque with which the engine operates at a rated engine speed, and a torque reduction control is exercised to reduce a maximum absorption torque of the hydraulic pump, thereby forcing the engine to generate an extra torque and actuating the generator motor as an electric motor to perform boost charging of the battery.

PRIOR ART DOCUMENT

Patent Document

Patent Document 1: JP-2015-206193-A

SUMMARY OF THE INVENTION

Problem to be Solved by the Invention

As described above, the hybrid work machine disclosed in Patent Document 1 enables the boost charge of the battery during operation of the work machine by increasing the engine output power torque at the time of rated engine speed by reducing the target engine speed and by exercising the torque reduction control to reduce the maximum absorption torque of the hydraulic pump. Exercising such control, however, possibly causes reduction in usability or operability of the work machine since the hydraulic pump torque reduction control limits an output power torque of the hydraulic pump and limits machine performance. Furthermore, because of charging while the work machine is operating, the engine output power torque=(hydraulic pump consumption torque)+(generator torque) and the charge amount of the battery by the generator is limited. Owing to this, the battery is often charged inappropriately.

The present invention has been achieved in the light of the above problems, and an object of the present invention is to provide a hybrid work machine that can achieve saving of fuel consumption and noise reduction by adopting a hybrid type and miniaturizing an engine and that can ensure safe and reliable battery charging in a case in which a charge amount of a battery is quite insufficient.

Means for Solving the Problem

To attain the object, according to the present invention, there is provided a hybrid work machine comprising: an engine; a hydraulic pump driven by the engine; a plurality of hydraulic actuators driven by a hydraulic fluid delivered from the hydraulic pump; a plurality of operation devices provided within an operation room and issuing commands regarding operations of the plurality of hydraulic actuators; an engine speed designation device that designates a target engine speed of the engine; a governor device that controls a fuel injection amount of the engine in such a manner that an engine speed of the engine is changed in response to the target engine speed of the engine and an output power torque of the engine increases as a load torque of the engine increases; a generator motor coupled to the engine; an electric storage device that supplies and receives electric power to and from the generator motor; and a first controller section configured to actuate the generator motor as an electric motor by supplying the electric power from the electric storage device to the generator motor to perform output power assist, and to actuate the generator motor as a generator by driving the generator motor to rotate by the engine to charge the electric storage device, wherein the hydraulic work machine further comprises: a gate lock lever that is provided within the operation room, and that is selectively operated to one of a lock position at which the operations of the plurality of hydraulic actuators by the plurality of operation devices are disabled and an unlock position at which the operations of the plurality of hydraulic actuators by the plurality of operation devices are enabled; a forced charging switch; a work machine monitor that notifies an operator that a charging rate of the electric storage device falls to be lower than a preset critical charging rate; and a second controller section actuated to increase the target engine speed of the engine from a low idle engine speed to an engine speed suited for forced charging and actuate the generator motor as the generator in this state to forcedly charge the electric storage device when the gate lock lever is operated to the lock position, the engine speed designation device designates the low idle engine speed, and the forced charging switch is operated.

In this way, according to the present invention, providing the first controller section makes it possible to achieve saving of fuel consumption and reduction in noise by adopting the hybrid type and miniaturizing the engine.

Furthermore, according to the present invention, providing the second controller section makes it possible to ensure safe and reliable battery charging in a case in which a charge amount of the battery is quite insufficient.

Effect of the Invention

According to the present invention, it is possible to achieve saving of fuel consumption and reduction in noise by adopting the hybrid type and miniaturizing the engine, and to ensure safe and reliable battery charging in a case in which a charge amount of the battery is quite insufficient.

MODES FOR CARRYING OUT THE INVENTION

Embodiments of the present invention will be described hereinafter with reference to the drawings.

Configuration

Figure 1:
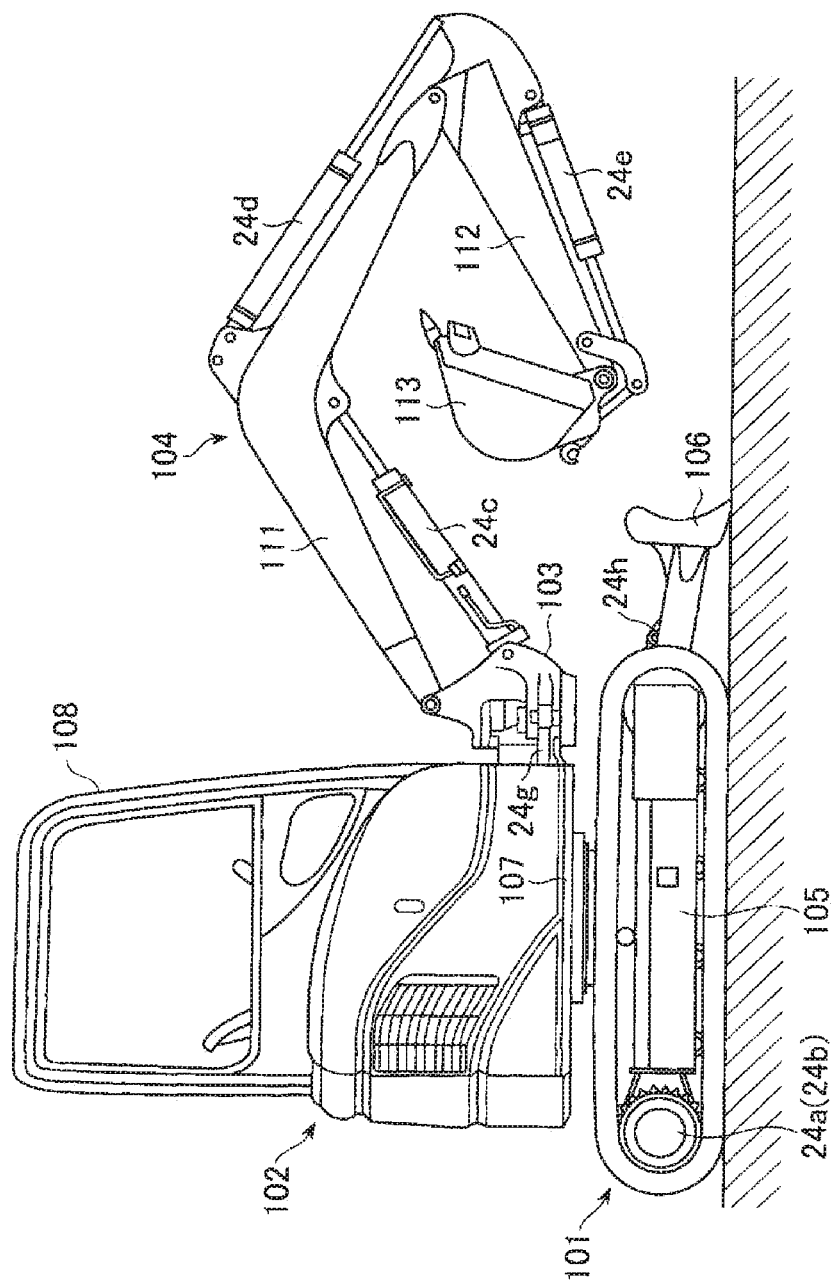
FIG. 1 is a diagram illustrating an outward appearance of a small-sized hydraulic excavator that is a hybrid work machine according to an embodiment of the present invention.

FIG. 1 is a diagram illustrating an outward appearance of a small-sized hydraulic excavator that is a hybrid work machine according to one embodiment of the present invention. In the present specification, the small-sized hydraulic excavator means a hydraulic excavator including a mini-excavator in eight or less ton weight class.

The hydraulic excavator includes a lower track structure 101, an upper swing structure 102 swingably provided on this lower track structure 101, and a front work implement 104 coupled to a tip end portion of this upper swing structure 102 via a swing post 103 in a rotatable manner in vertical and lateral directions. The lower track structure 101 is a crawler type and a vertically movable excavation blade 106 is provided forward of a track frame 105. The upper swing structure 102 includes a swing structure 107 that forms a foundation lower structure and a cabin (operation room) 108 provided on the swing structure 107. The front work implement 104 includes a boom 111, an arm 112, and a bucket 113, a base end of the boom 111 is pin-connected to the swing post 103, a tip end of the boom 111 is pin-connected to a base end of the arm 112, and a tip end of the arm 112 is pin-connected to the bucket 113.

The upper swing structure 102 is driven to swing with respect to the lower track structure 101 by a swing motor that is not illustrated, and the swing post 103 and the front work implement 104 are driven by the swing cylinder 24g to laterally rotate with respect to the swing structure 107. In addition, the boom 111, the arm 112, and the bucket 113 are driven to vertically rotate by expanding/contracting a boom cylinder 24c, an arm cylinder 24d, and a bucket cylinder 24e, respectively. The lower track structure 101 is driven to rotate by left and right travel motors 24a and 24b, and the blade 106 is vertically driven by a blade cylinder 24h.

Figure 2:
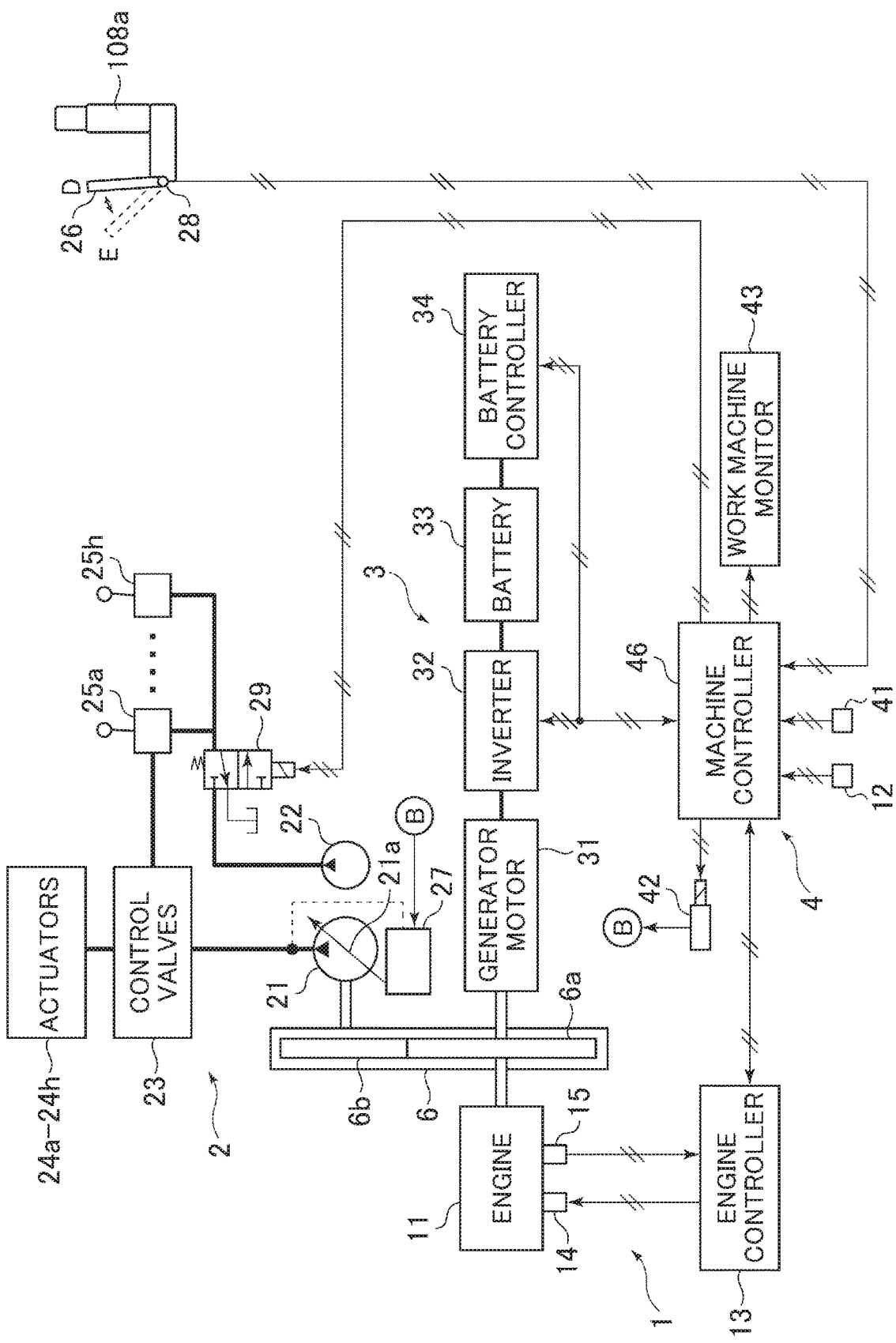
FIG. 2 is a diagram illustrating a hybrid driving system of the hydraulic excavator illustrated in FIG. 1.

FIG. 2 is a diagram illustrating a hybrid driving system of the hydraulic excavator illustrated in FIG. 1. In FIG. 2, the hybrid driving system includes an engine system 1, a hydraulic system 2, a generator-motor system 3, and a control system 4.

The engine system 1 includes a diesel engine 11, an engine control dial 12, an engine controller 13, an electronic governor 14, and an engine speed sensor 15. The diesel engine 11 is a downsized engine (with low engine output power), compared with a diesel engine of a conventional system that does not include the generator-motor system 3.

The hydraulic system 2 includes a hydraulic pump 21 and a pilot pump 22, a control valve 23, a plurality of hydraulic actuators 24a to 24h, a plurality of operation devices 25a to 25h, and a pump regulator 27. The hydraulic system 2 also includes a gate lock lever 26 and a gate lock valve 29. The gate lock valve 29 is a solenoid valve.

The generator-motor system 3 includes a generator motor 31, an inverter 32, a battery (electric storage device) 33, and a battery controller 34.

The control system 4 includes a gate lock sensor 28, a forced charging switch 41, a torque reduction control solenoid valve 42, a work machine monitor 43, and a machine controller 46.

In the engine system 1, the engine control dial 12 designates a target engine speed of the engine 11 by operator's operation. The target engine speed is defined as an engine speed when a load is not loaded into the engine 11. A target engine speed signal designated by the engine control dial 12 is input to the engine controller 13 via the machine controller 46. In addition, the engine controller 13 performs a predetermined computation process to determine a target fuel injection amount, controls a fuel injection amount by which a fuel is injected to each cylinder of the engine by controlling the electronic governor 14, and controls an engine output power torque and an engine speed.

An output shaft of the engine 11 is coupled, via a power transfer 6 configured with a large-diameter gear 6a and a small-diameter gear 6b, to the hydraulic pump 21 and the pilot pump 22 of the hydraulic system 2 and to the generator motor 31 of the generator-motor system 3.

In the hydraulic system 2, the hydraulic pump 21 and the pilot pump 22 are driven by the engine 11 and by the generator motor 31 operating as an electric motor. A hydraulic fluid delivered from the hydraulic pump 21 is supplied to the plurality of hydraulic actuators 24a to 24h via the control valve 23 to drive the driven bodies. The hydraulic pump 21 is a variable displacement type and includes a displacement varying mechanism (for example, a swash plate) 21a. A tilting position of the displacement varying mechanism 21a is regulated by the pump regulator 27 and a capacity of the hydraulic pump is controlled.

The plurality of hydraulic actuators 24a to 24h include the left and right travel motors 24a and 24b, the boom cylinder 24c, the arm cylinder 24d, the bucket cylinder 24e, the blade cylinder 24h, the swing cylinder 24g, the swing motor that is not illustrated, as described above.

The control valve 23 contains a plurality of main spools corresponding to the plurality of hydraulic actuators 24a to 24h, and these main spools are operated to be changed over by hydraulic signals (operation pilot pressures) output from the operation devices 25a to 25h.

When the engine 11 has an extra torque, the generator motor 31 in the generator-motor system 3 is driven by the extra torque to operate as the electric motor. Electric energy generated by the generator motor 31 is stored in the battery 33 via the inverter 32. Furthermore, when a ratio of an electric storage amount to a capacity of the battery 33 (hereinafter, referred to as "charging rate") is equal to or higher than a charging rate (for example, 30%) necessary for assist driving the hydraulic pump 21 and there is a need for assist driving the hydraulic pump 21, then the electric energy stored in the battery 33 is supplied to the generator motor 31 via the inverter 32 to cause the generator motor 31 to operate as the electric motor. The battery controller 34 monitors the electric storage amount of the battery 33 and transmits information associated with the electric storage amount (electric storage information) such as the charging rate to the machine controller.

In the control system 4, the machine controller 46 is electrically connected to the gate lock sensor 28, the forced charging switch 41, the torque reduction control solenoid valve 42, and the work machine monitor 43. The machine controller 46 is also electrically connected to the inverter 32, the battery controller 34, the engine control dial 12, and the engine controller 13. The designation signal (target engine speed of the engine 11) from the engine control dial 12, engine speed information (an actual engine speed of the engine 11 detected by the engine speed sensor 15) from the engine controller 13, a detection signal (ON/OFF signal with respect to the gate lock lever 26) from the gate lock sensor 28, the electric storage information (charging rate) from the battery controller 34, and an operation signal with respect to the forced charging switch 41 are input to the machine controller 46. In addition, the machine controller 46 performs a predetermined computation process and outputs control signals to the engine controller 13, the gate lock valve 29, the inverter 32, the battery controller 34, the torque reduction control solenoid valve 42, and the work machine monitor 43.

Figure 3:
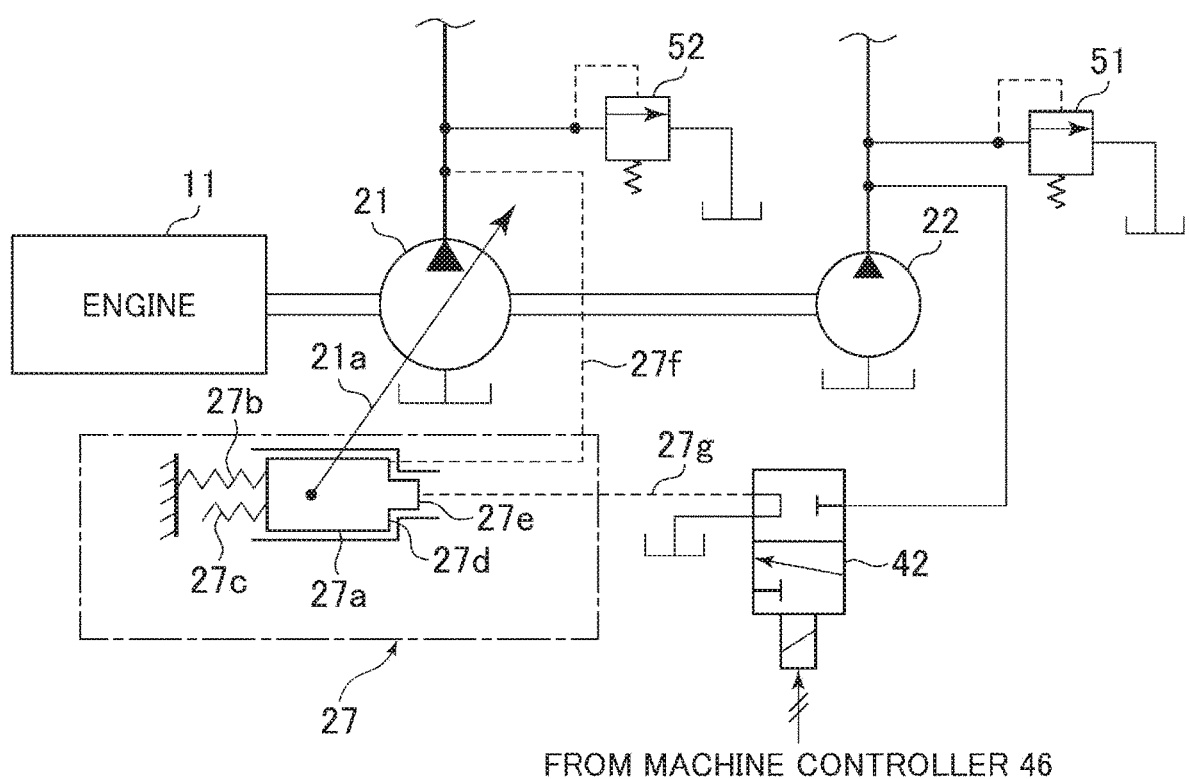
FIG. 3 is a diagram illustrating a detailed configuration of a pump regulator.

FIG. 3 is a diagram illustrating a detailed configuration of the pump regulator 27. FIG. 3 depicts only a configuration of a torque control section and does not depict a configuration of a section controlling the tilting position of the displacement varying mechanism 21a of the hydraulic pump 21 in response to operation amounts of the operation devices 25a to 25h.

In FIG. 3, the pump regulator 27 has a control spool 27a operatively coupled to the displacement varying mechanism 21a of the hydraulic pump 21, two springs 27b and 27c acting on this control spool 27a in a direction in which the capacity of the hydraulic pump 21 increases and having different lengths, and first and second pressure receiving sections 27d and 27e acting on the control spool 27a in a direction in which the capacity of the hydraulic pump 21 decreases. A delivery pressure of the hydraulic pump 21 is introduced to the first pressure receiving section 27d via a pilot line 27f.

When the control signal is not output from the machine controller 46, the torque reduction control solenoid valve 42 is at an OFF position illustrated in FIG. 3 to communicate the second pressure receiving section 27e of the pump regulator 27 with a tank. When the control signal is output from the machine controller 46, then the torque reduction control solenoid valve 42 is switched to an ON position to introduce a delivery pressure of the pilot pump 22 to the second pressure receiving section 27e as a control pressure. The delivery pressure of the pilot pump 22 is kept at a constant value (for example, 4 Mpa) by a pilot relief valve 51.

Figure 4:
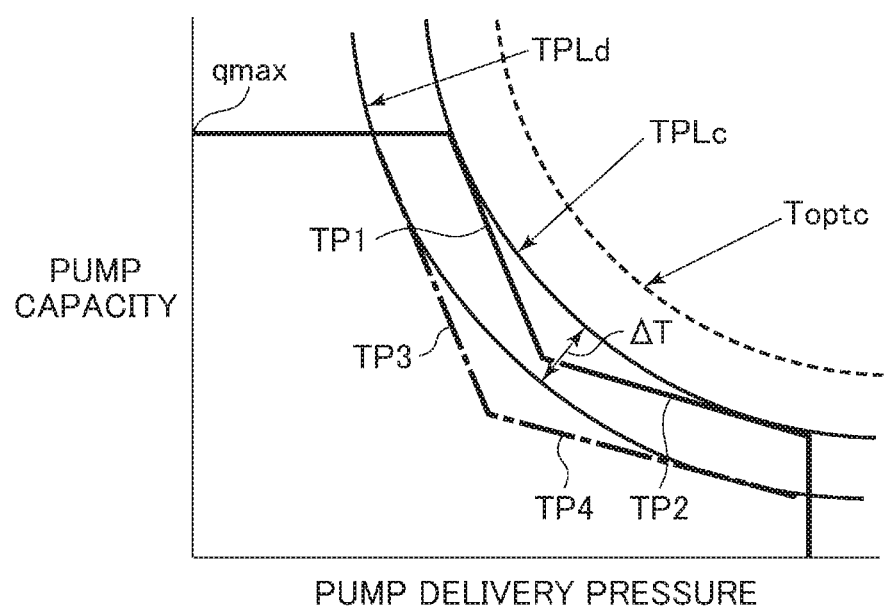
FIG. 4 is a pump torque characteristic diagram illustrating functions of a torque control section of the pump regulator.

FIG. 4 is a pump torque characteristic diagram illustrating functions of the torque control section of the pump regulator 27, a horizontal axis indicates the delivery pressure of the hydraulic pump 21, and a vertical axis indicates the capacity of the hydraulic pump 21.

Furthermore, in FIG. 4, a bending line configured from two straight lines (solid lines) denoted by symbols TP1 and TP2 represents a maximum absorption torque characteristic set by the springs 27b and 27c when the torque reduction control solenoid valve 42 is at the OFF position. A curve denoted by symbol TPLc tangent to the straight lines TP1 and TP2 represents a maximum absorption torque (limit torque) of the hydraulic pump 21. The maximum absorption torque TPLc of the hydraulic pump 21 is set to be lower than a rated system torque Toptc, which is obtained by adding a maximum torque TMmax of the generator motor 31 to a rated torque Topt of the engine 11, by a predetermined margin. Control is exercised in such a manner that an absorption torque of the hydraulic pump 21 does not exceed the limit torque TPLc. When the delivery pressure of the hydraulic pump 21 reaches a set pressure of the relief valve 52, a further increase in the delivery pressure of the hydraulic pump 21 is inhibited.

When the torque reduction control solenoid valve 42 is switched to the ON position, then the control pressure is introduced to the second pressure receiving section 27e, and a hydraulic force of the second pressure receiving section 27e acts on the control spool 27a against an urging force of the springs 27b and 27c. The maximum absorption torque set by the springs 27b and 27c is thereby regulated to decrease by as much as the hydraulic force of the second pressure receiving section 27e, and the maximum absorption torque characteristic is shifted from the bending line configured with the solid straight lines TP1 and TP2 to a bending line configured with chain-line straight lines TP3 and TP4 (torque reduction amount ΔTPd1). As a result, the maximum absorption torque (product between a pump delivery pressure and a maximum capacity) of the hydraulic pump 21 is reduced from the maximum absorption torque TPLc of the straight lines TP1 and TP2 to a curve TPLd tangent to the straight lines TP3 and TP4 (torque reduction amount ΔT); thus, an extra torque is forced to be generated in the engine 11. This control will be referred to as "torque reduction control" in the present specification.

Gate Lock Lever 26

A cab seat 108a is installed within the cabin 108 of the hydraulic excavator and the gate lock lever 26 is provided in a front left portion of the cab seat 108a (on an entrance side of the cabin 108). The gate lock lever 26 can be selectively operated to an UP position (lock position) D for opening an entrance of the cab seat 108a or a DOWN position (unlock position) E for limiting the entrance of the cab seat 108a. When the gate lock lever 26 is at the UP position (lock position) D, then an output signal from the gate lock sensor 28 is an OFF signal, and the machine controller 46 cancels excitation of the gate lock valve 29 to change over a position of the gate lock valve 29 to a position illustrated in FIG. 2. At this time, communication of the pilot pump 22 with remote control valves contained in the operation devices 25a to 25h is interrupted to prohibit the operation devices 25a to 25h from generating the operation pilot pressures; thus, the control valve 23 is unable to be operated to make the actuators 24a to 24h inoperative. When the gate lock lever 26 is operated down to the DOWN position (unlock position) E, then the gate lock sensor 28a outputs an ON signal, the machine controller 46 excites the gate lock valve 29 to change over the position of the gate lock valve 29 from the position illustrated in FIG. 2. At this time, the pressure of the pilot pump 22 is introduced to the remote control valves contained in the operation devices 25a to 25h to enable the operation devices 25a to 25h to generate the operation pilot pressures; thus, the control valve 23 can be operated to make the actuators 24a to 24h operative.

Charging Control of Machine Controller 46

Charging control of the machine controller 46 will next be described with reference to FIGS. 5 to 9.

Figure 5:
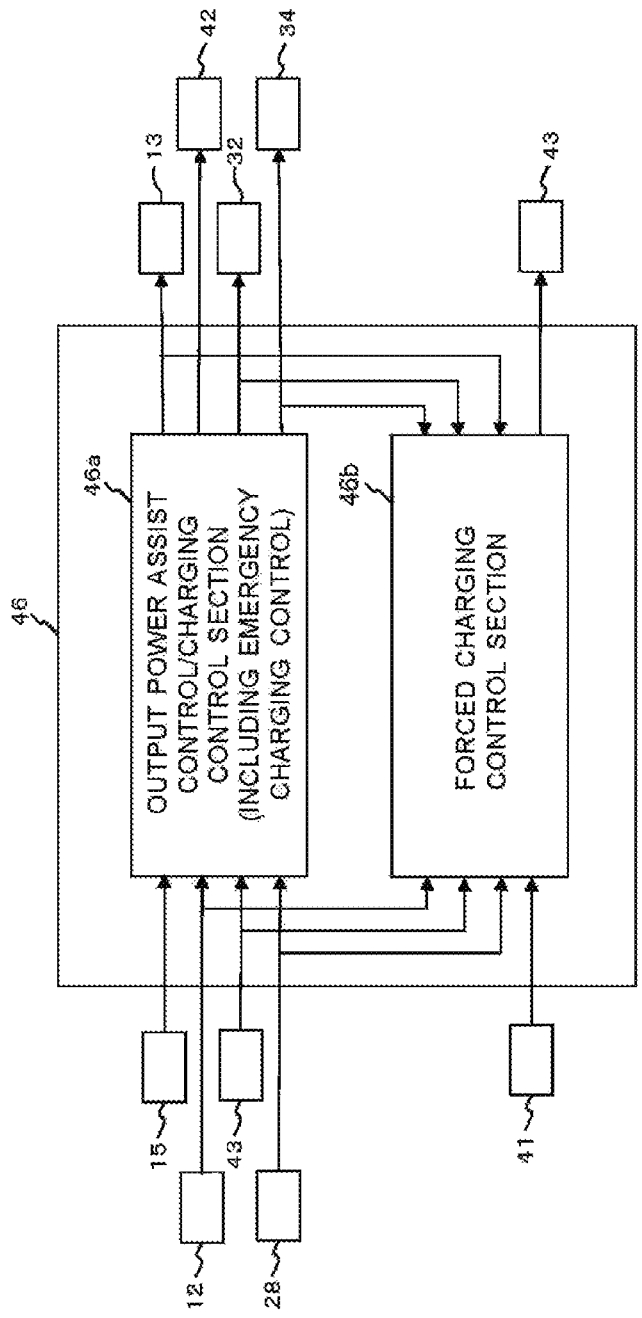
FIG. 5 is a block diagram illustrating charging control functions of a machine controller.

FIG. 5 is a block diagram illustrating charging control functions of the machine controller 46. The machine controller has an output power assist control/charging control section 46a (first controller section) and a forced charging control section 46b (second controller section). The output power assist control/charging control section 46a includes a function of emergency charging control, and exercises control over emergency battery charging while allowing the hydraulic excavator to continue work to a certain extent under this emergency charging control. The forced charging control section 46b causes work to be halted or ended in response to operator's intention to enable dedication to the battery charging control.

Figure 6:
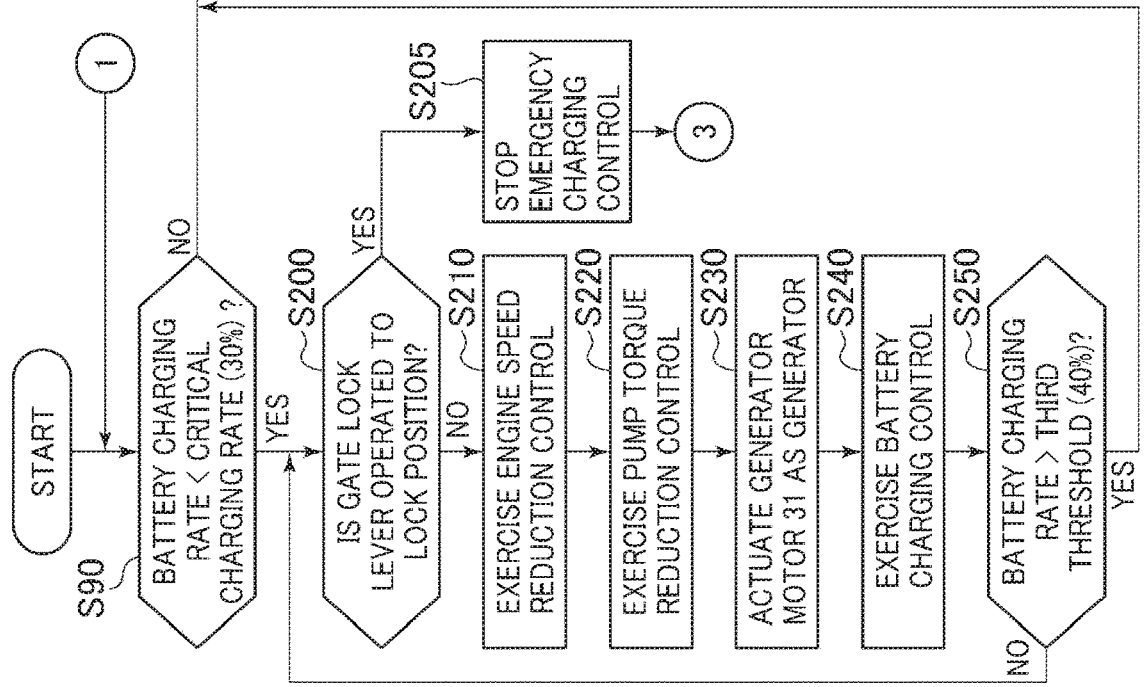
FIG. 6 is a flowchart illustrating a control function of an output power assist control/charging control section (first controller section).

FIG. 6 is a flowchart illustrating a control function of the output power assist control/charging control section 46a (first controller section).

First, the output power assist control/charging control section 46a determines whether the charging rate of the battery 33 acquired from the electric storage information input from the battery controller 34 is lower than a preset critical charging rate (SOC) (Step S90). The critical charging rate means an extremely low charging rate at which it is difficult for the hydraulic excavator to continue work while the hydraulic excavator is assist driven by the generator motor 31 and is, for example, 30%. When a determination result of Step S90 is NO (battery charging rate≥30%), the output power assist control/charging control section 46a determines whether the battery charging rate is lower than a first threshold at which the hydraulic excavator can continue to work (Step S100). The first threshold at which the hydraulic excavator can continue to work means a charging rate which indicates that the hydraulic excavator can continue to work at a battery charge amount while the hydraulic pump 21 is assist driven by the generator motor 31 but which indicates that it is preferable to perform battery charging under the battery charging control, and is a higher charging rate (for example, 50%) than the critical charging rate (for example, 30%) used in determination of Step S90. When a determination result of Step S100 is YES (battery charging rate<50%), the output power assist control/charging control section 46a determines whether a current engine speed (actual engine speed) acquired from the engine speed information input from the engine controller 13 is lower than a maximum horsepower engine speed NRx (Step S110). It is noted that the maximum horsepower engine speed is a rated engine speed NRmax when the target engine speed designated by the engine control dial 12 is a maximum NTmax.

When a determination result of Step S110 is YES (engine speed<maximum horsepower engine speed NRx), the output power assist control/charging control section 46a actuates the generator motor 31 as an electric motor (Step S140A), returns to Step S90, and repeatedly executes processes in and after Step S90. Output power assist control executed in Step S140A increases the engine speed back to the maximum horsepower engine speed NRx and keeps the engine speed equal to the maximum horsepower engine speed NRx. Furthermore, the output power torque of the hybrid driving system increases up to the rated torque Toptc (refer to FIG. 4) and system output horsepower also increases. As a control method of actuating the generator motor 31 as the electric motor, the generator motor 31 may be controlled in such a manner, for example, that an engine speed deviation $\Delta Nd$ is determined by subtracting the engine speed (actual engine speed) from the maximum horsepower engine speed and that a driving torque increases as this engine speed deviation $\Delta Nd$ is greater.

When the determination result of Step S110 is NO (engine speed≥maximum horsepower engine speed NRx), this determination results corresponds to a case in which a load torque of the engine 11 (absorption torque of the hydraulic pump 21) is lower than the rated torque Topt of the engine 11 and the engine 11 has an extra torque. In this case, the generator motor 31 is driven by the extra torque of the engine 11 to be actuated as a generator (Step S120) and the output power assist control/charging control section 46a exercises battery charging control (Step S130). The output power torque of the engine 11 thereby increases up to the rated torque Topt, the engine speed falls down to the maximum horsepower engine speed NRx, and the engine output horsepower increases up to the maximum horsepower. Moreover, the generator motor 31 is driven by the extra torque of the engine 11 and electric power generated by the generator motor 31 is stored in the battery 33 via the inverter 32. As a control method of actuating the generator motor 31 as the generator, the generator motor 31 may be controlled in such a manner, for example, that an engine speed deviation $\Delta Nc$ is determined by subtracting the maximum horsepower engine speed from the engine speed (actual engine speed) and that a power generation torque increases as this engine speed deviation $\Delta Nc$ is greater.

Subsequently to Step S130, the output power assist control/charging control section 46a determines whether the battery charging rate is higher than a second threshold at which the hydraulic excavator can continue to work (Step S150). The second threshold at which the hydraulic excavator can continue to work means a charging rate at which battery charging is unnecessary and which is higher (for example, 70%) than the first threshold. When a determination result of Step S150 is YES (battery charging rate>70%), the output power assist control/charging control section 46a ends processing. On the other than, when the determination result of Step S150 is NO (battery charging rate≤70%), the output power assist control/charging control section 46a returns to Step S100 and repeatedly executes processes in and after Step S100.

When the determination result of Step S100 is NO (battery charging rate≤50%), this determination results corresponds to a case in which the battery 33 is considered to be unnecessary to charge. In this case, the output power assist control/charging control section 46a determines whether the engine speed is lower than the maximum horsepower engine speed NRx (Step S160) similarly to Step S110. When a determination result of Step S160 is YES (engine speed<maximum horsepower engine speed NRx), the output power assist control/charging control section 46a actuates the generator motor 31 as the electric motor (Step S140B), returns to Step S100, and repeatedly executes processes in and after Step S100. The engine speed is thereby kept equal to the maximum horsepower engine speed NRx, the system output power torque increases up to the rated torque Toptc (refer to FIG. 4), and the system output horsepower also increases. On the other hand, when the determination result of Step S160 is NO (engine speed≥maximum horsepower engine speed NRx), the output power assist control/charging control section 46a ends processing.

In Step S90, when the charging rate of the battery 33 is equal to or lower than the preset critical charging rate (for example, 30%), the output power assist control/charging control section 46a goes to Step S200. In Step S200, the output power assist control/charging control section 46a determines whether the gate lock lever 26 is operated to the lock position D on the basis of the output signal from the gate lock sensor 28 (Step S200). When the output power assist control/charging control section 46a determines that the gate lock lever 26 is not operated to the lock position D, the output power assist control/charging control section 46a goes to Step S210.

Step S210 and the following steps are processing procedures for the emergency charging control. After exercising engine speed reduction control (Step S210) and pump torque reduction control (Step S220), the output power assist control/charging control section 46a exercises charging control over the battery 33 (Steps S230 and S240).

Figure 8:
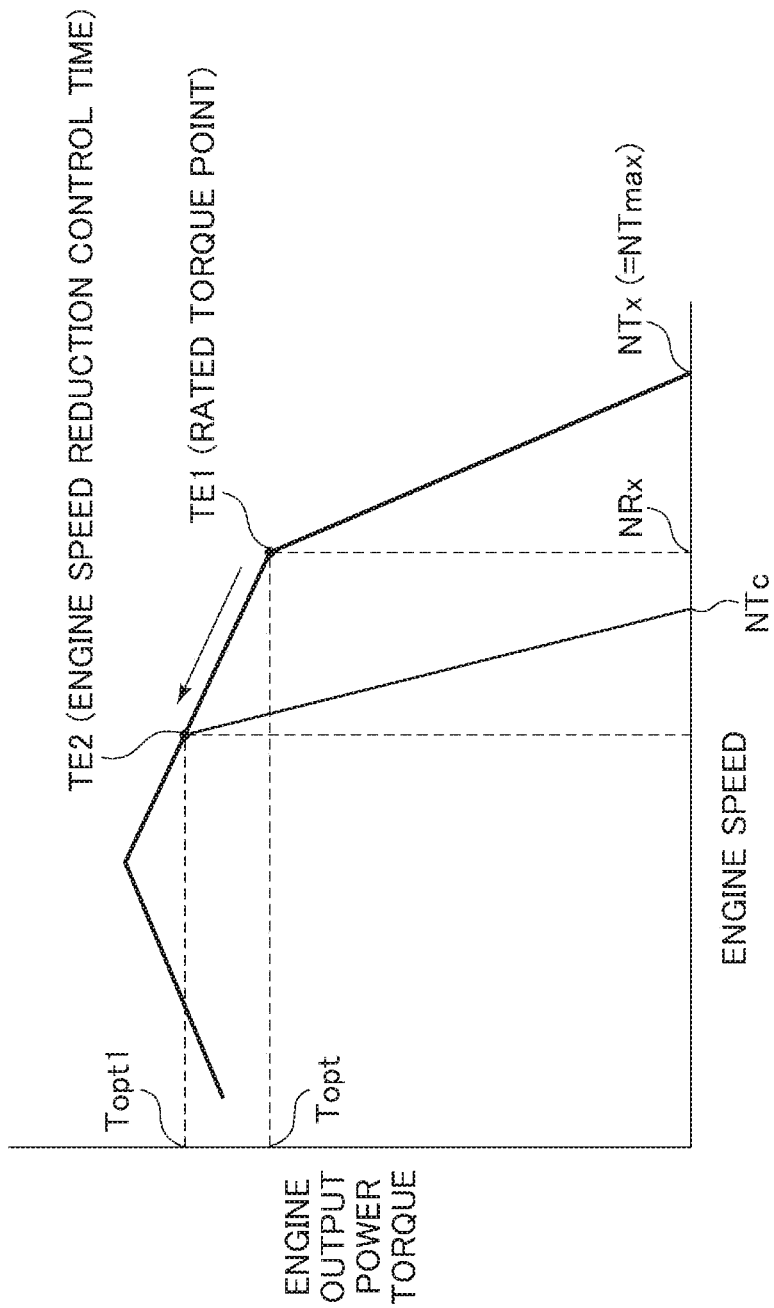
FIG. 8 is a diagram illustrating changes in an engine speed and an engine output power torque under engine speed reduction control.

In the engine speed reduction control of Step S210, the output power assist control/charging control section 46a exercises control to reduce the maximum target engine speed of the engine 11 from NTmax to NTc. FIG. 8 is a diagram illustrating changes in the engine speed and the engine output power torque under the engine speed reduction control. The machine controller 46 stores a target engine speed NTc for the engine speed reduction control in advance, and outputs the target engine speed NTc in place of the target engine speed NTx (maximum engine speed in an example of FIG. 8) designated by the engine control dial 12 to the engine controller 13. The engine controller 13 calculates a fuel injection amount on the basis of the target engine speed NTc and controls the electronic governor 14. The output power torque of the engine 11 at the maximum horsepower engine speed thereby increases from Topt at a rated torque point TE1 to Topt1 at a point TE2.

In the pump torque reduction control of Step S220, the machine controller 46 outputs a control signal to the torque reduction control solenoid valve 42 to exercise control to reduce the maximum absorption torque of the hydraulic pump 21 from TPLc to TPLd (FIG. 4).

In the charging control of Steps S230 and S240, the output power assist control/charging control section 46a actuates the generator motor 31 as the generator using the extra torque of the engine 11 forcedly generated under the engine speed reduction control and the pump torque reduction control described above, and performs emergency charging of the battery 33 while allowing the hydraulic excavator to continue to work to a certain extent.

Subsequently to Step S240, the output power assist control/charging control section 46a determines whether the charging rate of the battery 33 is higher than a preset third threshold at which the hydraulic excavator can continue to work (Step S250). The third threshold at which the hydraulic excavator can continue to work means herein a charging rate that indicates that the charge amount of the battery 33 has gotten through an extremely insufficient state and that is a higher charging rate (for example, 40%) than the critical charging rate (for example, 30%) used in the determination of Step S90. When a determination result of Step S250 is NO (battery charging rate≤third threshold (40%)), the output power assist control/charging control section 46a repeatedly executes processes in Steps S210 to S240 until the battery charging rate becomes equal to or higher than the third threshold at which the hydraulic excavator can continue to work.

When the determination result of Step S250 is YES (battery charging rate>third threshold (40%)), the output power assist control/charging control section 46a goes to Step S100 and exercises the output power assist control (step S140A or S140B) or the charging control (Steps S120 and S130) described above.

On the other hand, when the gate lock lever 26 is operated to the unlock position E and the gate lock sensor 28 outputs an ON signal in Step S200, the output power assist control/charging control section 46a disables the emergency charging control (Step S205).

In this way, the output power assist control/charging control section 46a (first controller section) actuates the generator motor 31 as the electric motor by supplying the electric power from the battery (electric storage device) 33 to the generator motor 31 to perform output power assist, and actuates the generator motor 31 as the generator by driving the generator motor 31 to rotate by the engine 11 to charge the battery 33. Furthermore, the output power assist control/charging control section 46a (first controller section) includes the function to exercise the emergency charging control, and enables the emergency charging control in such a manner as to exercise the engine speed reduction control to reduce the target engine speed of the engine 11 and the torque reduction control to reduce the maximum absorption torque of the hydraulic pump 21 and to actuate the generator motor 31 as the generator using the extra torque generated in the engine 11 by the engine speed reduction control and the torque reduction control to charge the battery 33 when the charging rate of the battery 33 falls to be lower than the critical charging rate. Moreover, when the gate lock lever 26 is operated to the lock position D, the output power assist control/charging control section 46a (first controller section) disables the emergency charging control.

Figure 7A:
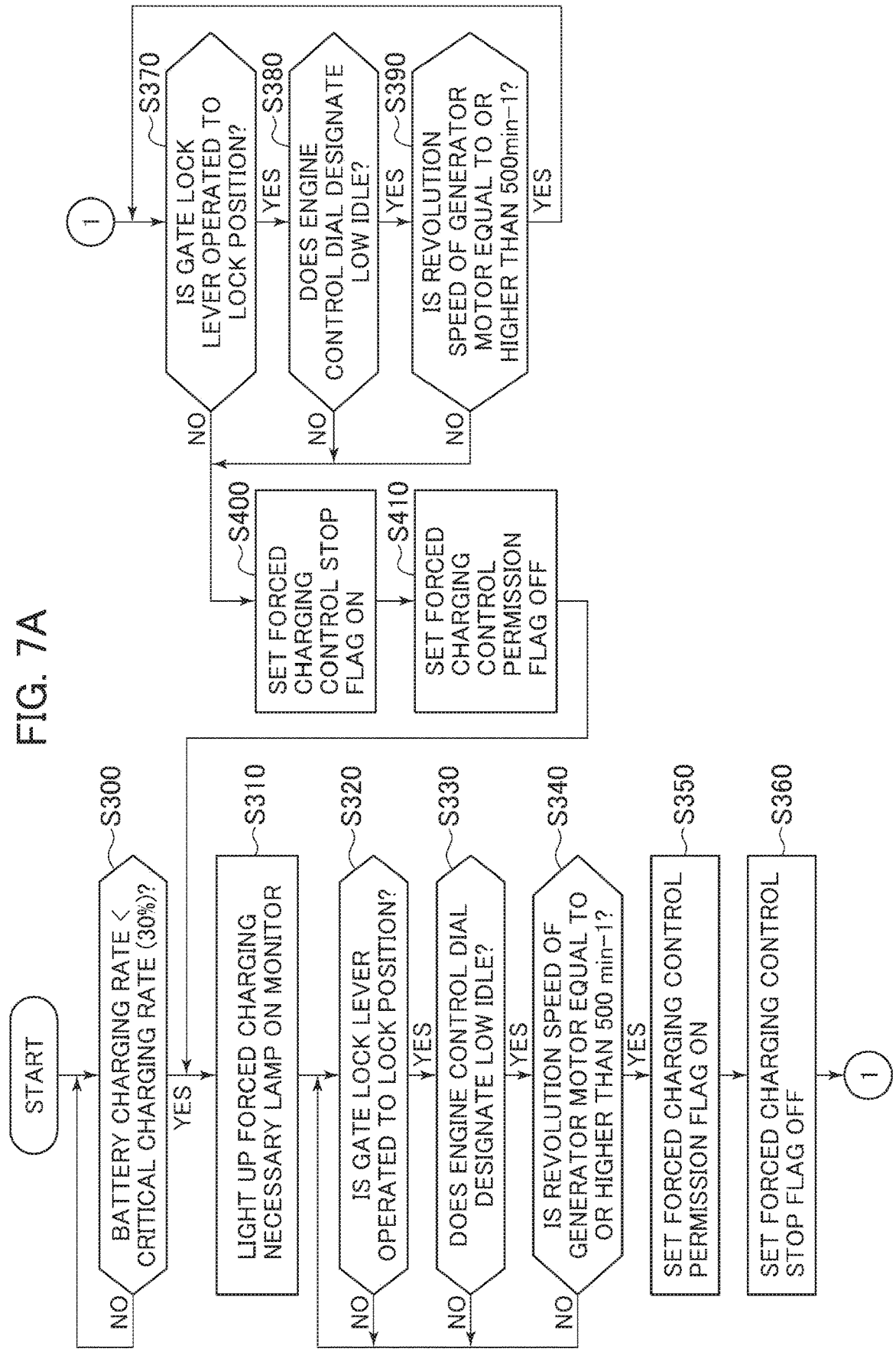
FIG. 7A is a flowchart illustrating a control function (flag setting control) of a forced charging control section.
Figure 7B:
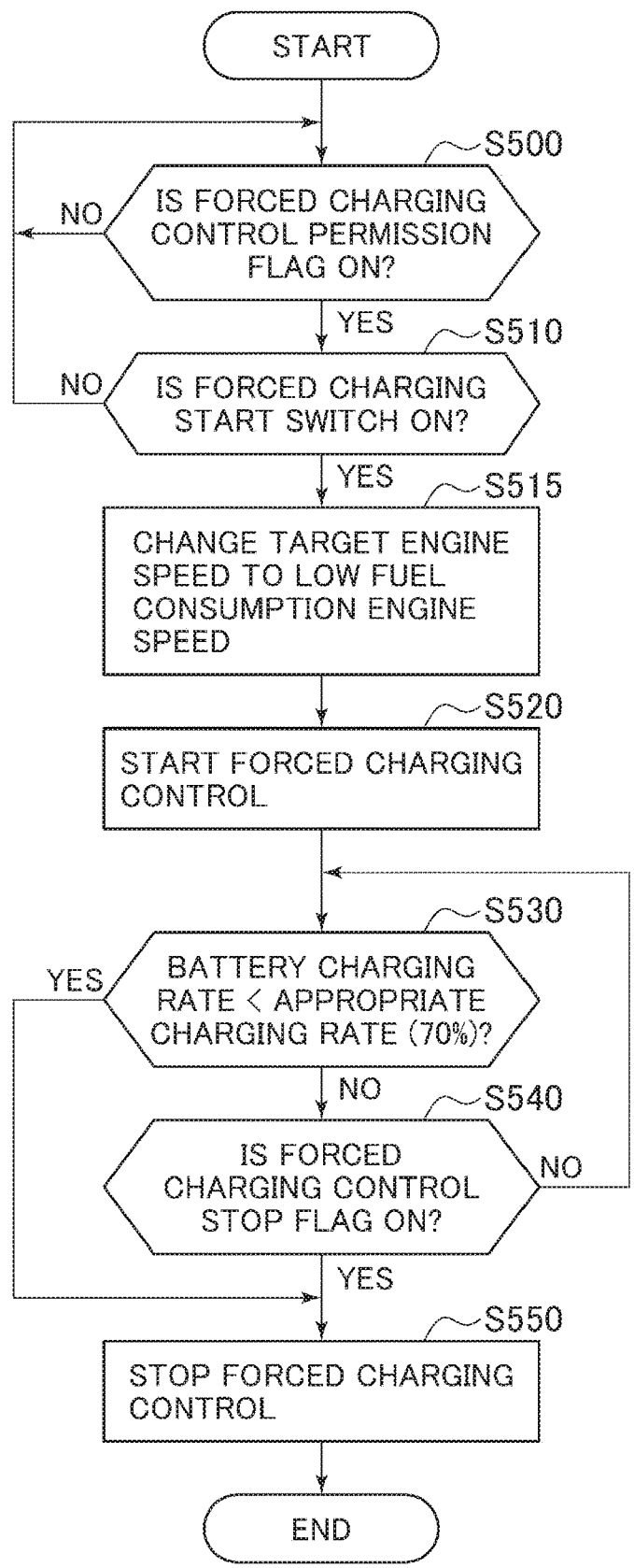
FIG. 7B is a flowchart illustrating a control function (forced charging control) of the forced charging control section.

FIGS. 7A and 7B are flowcharts illustrating a control function of the forced charging control section 46b (second controller section). The forced charging control section 46b is configured with a combination of flag setting control illustrated in FIG. 7A and forced charging control section illustrated in FIG. 7B.

First, as illustrated in FIG. 7A, the forced charging control section 46b determines whether the charging rate of the battery 33 acquired from the electric storage information input from the battery controller 34 is lower than the preset critical charging rate (SOC) (Step S300). The critical charging rate is the same as that used in the determination of Step S90 of the emergency charging control illustrated in FIG. 6, and is the extremely low charging rate (for example, 30%) at which it is difficult for the hydraulic excavator to continue work while the hydraulic excavator is assist driven by the generator motor 31. When a determination result of Step S300 is YES (battery charging rate<30%), the forced charging control section 46b lights up a forced charging necessary lamp on the work machine monitor 43 in order to inform an operator that the charging rate of the battery 33 extremely falls (Step S310). At this time, the forced charging control section 46b may also display work procedures for the forced charging on the work machine monitor 43. Alternatively, the forced charging control section 46b may produce in the work machine monitor 43 an alarm indicating that the forced charging is necessary or inform the operator of the necessity of the forced charging by a sound. Furthermore, the forced charging necessary lamp lit up in Step S310 may be lit out after passage of predetermined time. When the determination result of Step S300 is NO (battery charging rate≥30%), the forced charging control section 46b repeats determination of Step S300.

Next, the forced charging control section 46b sequentially determines whether the gate lock lever 26 is operated to the lock position D on the basis of the output signal from the gate lock sensor 28 (Step S320), determines whether the target engine speed designated by the engine control dial 12 is a low idle engine speed (Step S330), and determines whether the revolution speed of the generator motor 31 is equal to or higher than 500 min−1 that is a lowest revolution speed at which the generator motor 31 can operate as the generator (Step S340). When determination results of Steps S320, S330, and S340 are all YES, the forced charging control section 46b sets a forced charging control permission flag on (Step S350) and sets a forced charging control stop flag off (Step S360). When the determination results of Steps S320, S330, and S340 are all NO, the forced charging control section 46b repeats determinations of Steps S320, S330, and S340. Furthermore, as described above, when the gate lock lever 26 is operated to the lock position D in Step S200 of FIG. 6, the emergency charging control is disabled (Step S205 of FIG. 6).

Next, the forced charging control section 46b sequentially determines whether the gate lock lever 26 is operated to the lock position D on the basis of the output signal from the gate lock sensor 28 (Step S370), determines whether the target engine speed designated by the engine control dial 12 is the low idle engine speed (Step S380), and determines whether the revolution speed of the generator motor 31 is equal to or higher than 500 min−1 (Step S390). When determination results of Steps S370, S380, and S390 are all NO, the forced charging control section 46b sets the forced charging control stop flag on (Step S400) and sets the forced charging control permission flag off (Step S410). When the determination results of Steps S370, S380, and S390 are all YES, the forced charging control section 46b repeats determinations of Steps S370, S380, and S390.

Furthermore, as illustrated in FIG. 7B, the forced charging control section 46b sequentially determines whether the forced charging control permission flag is on (Step S500) and determines whether the forced charging switch 41 is on (Step S510). When determination results of Steps S500 and S510 are both YES, the forced charging control section 46b changes the target engine speed of the engine 11 from the idle engine speed to an engine speed suited for the forced charging, for example, a low fuel consumption engine speed in a range of lowest fuel consumption (Step S515) and starts the forced charging control (Step S520). When the determination results of Steps S500 and S510 are both NO, the forced charging control section 46b repeats determinations of Steps S500 and S510.

In the forced charging control of Step S520, the forced charging control section 46b actuates the generator motor 31 as the generator to forcedly charge the battery 33. At this time, the target engine speed of the engine 11 increases from the low idle engine speed to the low fuel consumption engine speed, and the forced charging control section 46b exercises the forced charging control at the increased low fuel consumption engine speed.

Figure 9:
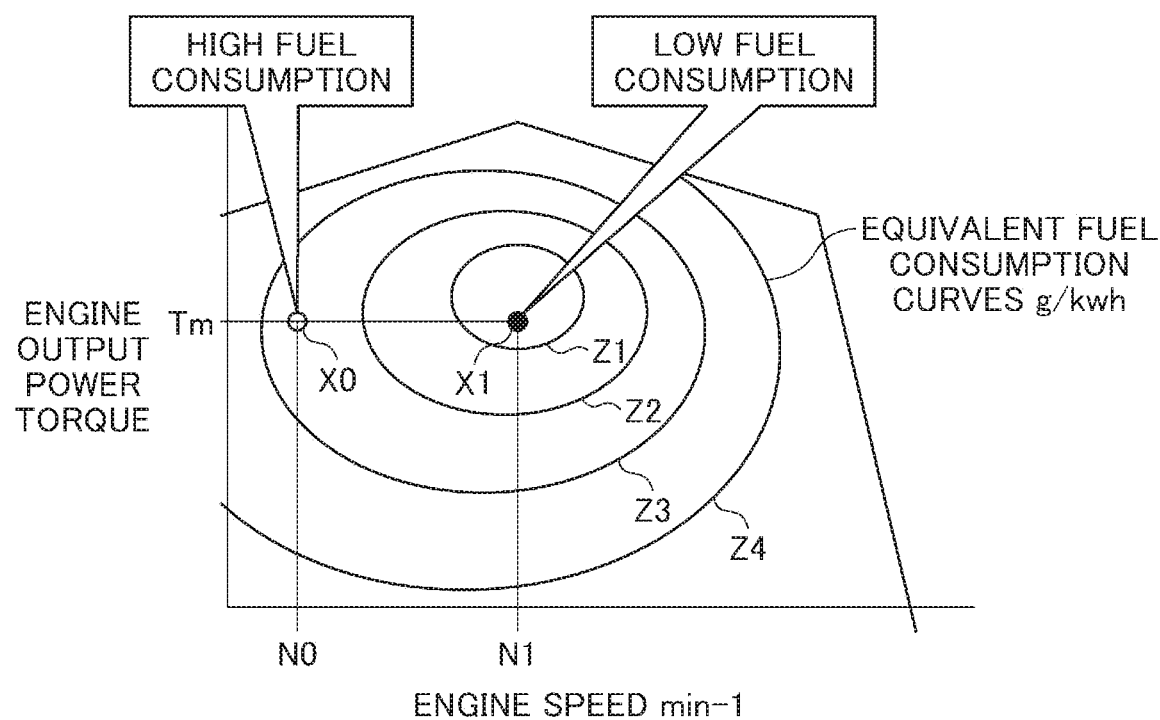
FIG. 9 is a diagram illustrating equivalent fuel consumption curves to be superimposed on a torque diagram of an engine.

FIG. 9 is a diagram illustrating equivalent fuel consumption curves to be superimposed on a torque diagram of the engine 11. In FIG. 9, N0 denotes the low idle engine speed and N1 denotes the low fuel consumption engine speed. In addition, Tm denotes the load torque of the engine 11 during the forced charging performed by driving the generator motor 31. Z1 to Z4 denote the equivalent fuel consumption curves, the equivalent fuel consumption curves are higher in fuel efficiency from outward to inward, and an inside region of the equivalent fuel consumption curve Z1 is the region of the lowest fuel consumption. It is noted that fuel consumption is an abbreviation of a rate of fuel consumption and is a value obtained by dividing an amount of fuel consumption (g/h) per hour of the engine 11 by electricity generated (kW) of the generator motor 31.

In the forced charging control in the present embodiment, the target engine speed of the engine 11 is the low idle engine speed N0 after the forced charging control permission flag is on and before the forced charging switch 41 is depressed. Subsequently, when the forced charging control permission flag is set on and the forced charging switch 41 is depressed, the engine speed of the engine 11 increases to the low fuel consumption engine speed N1 and the forced charging is started in this state. The load torque of the engine 11 at this time increases to Tm.

If the forced charging is performed with the target engine speed of the engine 11 kept at the low idle engine speed N0, the battery 33 is charged at a point X0 of high fuel consumption in the engine equivalent fuel consumption curves, resulting in high fuel consumption. By contrast, by increasing the target engine speed of the engine 11 to the low fuel consumption engine speed N1, the forced charging is performed at a point X1 near the lowest fuel consumption inside of the engine equivalent fuel consumption curve; thus, it is possible to charge the battery 33 with lower fuel consumption. It is noted that a reason for temporarily reducing the target engine speed of the engine 11 to the low idle engine speed N0 is to enable safe and smooth transition to the forced charging control.

Next, the forced charging control section 46b sequentially determines whether the battery charging rate is higher than a preset appropriate charging rate (Step S530) and determines whether the forced charging control stop flag is on (Step S540). When determination results of Steps S530 and S540 are both NO, the forced charging control section 46b repeats determinations of Steps S530 and S540 and continues to exercise the forced charging control. When the determination result of either Step S530 or S514 is YES, the forced charging control section 46b stops the forced charging control (S550). It is noted herein that the appropriate charging rate used in the determination of Step S530 means a charging rate indicating that the charge amount of the battery 33 does not adversely influence continuous work, and is, for example, 70% equal to the second threshold at which the hydraulic excavator can continue to work and which is used in the determination of Step S150 of the emergency charging control illustrated in FIG. 6.

In this way, the forced charging control section 46b (second controller section) increases the target engine speed of the engine 11 from the low idle engine speed N0 to the engine speed (low fuel consumption engine speed N1) suited for the forced charging and actuates the generator motor 31 as the generator to forcedly charge the battery 33 in this state when the gate lock lever 26 is operated to the lock position D, the engine control dial 12 (engine speed designation device) designates the low idle engine speed, and the forced charging switch 41 is operated.

Furthermore, the forced charging control section 46b stops actuating the generator motor 31 as the generator, ends the forced charging control, and reduces the target engine speed of the engine 11 from the low fuel consumption engine speed N1 to the low idle engine speed N0 when the charge amount of the battery 33 increases to the preset appropriate charging rate that does not adversely influence the continuous work.

Moreover, the forced charging control section 46b stops actuating the generator motor 31 as the generator, ends the forced charging control, and reduces the target engine speed of the engine 11 from the low fuel consumption engine speed N1 to the low idle engine speed N0 when the forced charging control stop flag is on, that is, the gate lock lever 26 is operated to the unlock position E while the forced charging of the battery 33 is ongoing, or when the engine control dial 12 is operated to change the target engine speed of the engine 11.

Operations

Operations of the hybrid work machine according to the present embodiment will be described while separately referring to a case in which the battery charging rate is equal to or higher than the first threshold of 50% at which the hybrid work machine can continue to work, a case in which the battery charging rate is lower than the first threshold 50%, and cases in which the battery charging rate is lower than the critical charging rate of 30%.

Case in which Battery Charging Rate is Equal to or Higher than 50%

The case in which the battery charging rate is equal to or higher than 50% is considered. In this case, when a load of the engine 11 increases and the engine speed falls to be equal to or lower than the maximum horsepower engine speed NRx, then the generator motor 31 is actuated as the electric motor (Step S140B), and the engine speed is controlled to be kept equal to the maximum horsepower engine speed NRx. The system output power torque thereby increases up to the rated torque Toptc (refer to FIG. 4); thus, even with the engine 11 miniaturized, the hybrid work device can carry out normal work as the hydraulic excavator. Furthermore, miniaturizing the engine 11 makes it possible to achieve saving of fuel consumption, improvement in exhaust gas emission characteristics, and noise reduction.

Case in which Battery Charging Rate is Lower than 50%

The case in which the battery charging rate is lower than 50% is considered. In this case, when the load of the engine 11 increases and the engine speed falls to be equal to or lower than the maximum horsepower engine speed NRx, then the generator motor 31 is actuated as the electric motor (Step S140A), and the engine speed is controlled to be kept equal to the maximum horsepower engine speed NRx, similarly to the case in which the battery charging rate is equal to or higher than 50%. Furthermore, when the load of the engine 11 is light and the engine speed is equal to or higher than the maximum horsepower engine speed NRx, the generator motor 31 is actuated as the generator using the extra torque of the engine 11 to charge the battery 33. It is thereby possible to charge the battery 33 while the hybrid work device carries out normal work as the hydraulic excavator.

Case 1 in which Battery Charging Rate is Lower than 30% (Emergency Charging Control)

In the case in which the charging rate of the battery 33 is lower than the critical charging rate (SOC) of 30%, the forced charging necessary lamp is lit up on the work machine monitor 43 to enable the operator to be notified of the necessity of the forced charging. In this case, the operator often desires to continue work depending on a work situation. In that case, the operator selects not the forced charging control but the emergency charging control and keeps the gate lock lever at the unlock position E. In this emergency charging control, the extra torque of the engine 11 is forcedly generated by the engine speed reduction control (Step S210) and the pump torque reduction control (Step S220), and the generator motor 31 is actuated as the generator using this extra torque to perform boost charge on the battery 33. Furthermore, the torque reduction control reduces the maximum absorption torque of the hydraulic pump 21 to TPLd of FIG. 4; however, a reduction amount of the maximum absorption torque of the hydraulic pump 21 can be suppressed by as much as an increased torque secured by the engine speed reduction control. This can suppress reduction in workload of the hydraulic excavator during the boost charge.

Case 2 in which Battery Charging Rate is Lower than 30% (Forced Charging Control)

In the case in which the charging rate of the battery 33 is lower than the critical charging rate (SOC) of 30%, the operator often selects the forced charging control depending on the work situation. In that case, the operator operates the gate lock lever to the lock position D, operates the engine control dial 12 to set the target engine speed to the low idle engine speed (Step S330), and turns on the forced charging switch 41. The emergency charging control is thereby disabled (Step S200) and the forced charging control is started (Steps S500 to S520). Furthermore, at this time, the target engine speed of the engine 11 temporarily reduced to the low idle engine speed N0 increases up to the low fuel consumption engine speed N1 (Step S215), and the forced charging control is exercised in this state. This can ensure safe and reliable charging at low fuel consumption.

Effects

As described so far, according to the present embodiment, suppressing a demanded torque of the engine 11 by the output power assist makes it possible to miniaturize the engine 11 and to achieve saving of fuel consumption, improvement in exhaust gas emission characteristics, and noise reduction.

Furthermore, in the case in which the charging rate of the battery 33 falls to be equal to or lower than the critical charging rate, exercising the engine speed reduction control to reduce the engine speed increases the engine output power torque to Topt1. It is thereby possible to suppress the reduction amount of the maximum absorption torque of the hydraulic pump 21 due to the torque reduction control and to perform the emergency charging on the battery 33 while suppressing reduction in the output power of the hydraulic pump 21 (reduction in the workload of the hydraulic excavator), compared with a case of generating the extra torque by exercising only the torque reduction control. This makes it possible to continue work to a certain extent even while the battery 33 is being charged and to suppress reduction in machine work efficiency.

Moreover, such emergency charging control possibly causes reduction in usability or operability of the work machine since the torque reduction control over the hydraulic pump 21 limits the output power torque of the hydraulic pump 21 and limits machine performance. Furthermore, because of charging while the work machine is operating, the engine output power torque=(hydraulic pump consumption torque)+(generator torque) and the charge amount of the battery 33 by the generator motor 31 is limited. Owing to this, the battery 33 is often charged inappropriately.

In such cases, in the present embodiment, lighting up the forced charging necessary lamp on the work machine monitor 43 enables the operator to be notified that the charging rate of the battery 33 is lower than the critical charging rate (SOC), and causes the operator to operate the gate lock lever to the lock position D, to operate the engine control dial 12 to set the target engine speed to the low idle engine speed, and to turn on the forced charging switch 41. The forced charging control is thereby started (Steps S500 to S520), and it is possible to ensure that the battery 33 is charged up to the appropriate charging rate (70%). Furthermore, at this time, the target engine speed of the engine 11 is temporarily reduced to the low idle engine speed N0 and then increases to the low fuel consumption engine speed that is the engine speed suited for the forced charging control; thus, it is possible to ensure safe and smooth transition to the forced charging control and ensure reliable charging of the battery 33. Moreover, when the forced charging control is started, the target engine speed of the engine 11 temporarily reduced to the low idle engine speed N0 increases up to the low fuel consumption engine speed N1; thus, it is possible to charge the battery 33 at low fuel consumption.

Furthermore, in the present embodiment, the forced charging control is stopped by returning the gate lock lever 26 to the unlock position or operating the engine control dial 12 to set a desired target engine speed of the engine 11. Therefore, the operator can end the forced charging control and resume work at any time.

Modifications

In the present embodiment, the output power assist control/charging control section 46a of the machine controller includes the function of the emergency charging control to make it possible to select either the emergency charging control or the forced charging control section in the case in which the charging rate of the battery 33 is lower than the critical charging rate (SOC) of 30%. Alternatively, the output power assist control/charging control section 46a may be allowed to exercise only the forced charging control section without the function of the emergency charging control.

Furthermore, in the embodiment described above, the emergency charging control is disabled when the gate lock lever 26 is operated to the lock position D at a time of starting the forced charging control. Alternatively, the emergency charging control may be disabled when the engine control dial 12 designates the low idle engine speed, or the emergency charging control may be disabled when the gate lock lever 26 is operated to the lock position D and the engine control dial 12 designates the low idle engine speed.

Moreover, in the embodiment described above, the target engine speed of the engine 11 temporarily reduced to the low idle engine speed N0 is increased to the low fuel consumption engine speed N1 at the time of starting the forced charging control. Alternatively, the target engine speed of the engine 11 may be increased to a target engine speed other than the low fuel consumption engine speed N1 and suited for the forced charging. For example, the target engine speed of the engine 11 may be increased up to an engine speed higher in engine output power torque than the low fuel consumption engine speed N1, for example, up to the rated engine speed, and it is thereby possible to charge the battery 33 more quickly.

Moreover, in the present embodiment, the hydraulic work machine is configured such that the hydraulic pump 21, the pilot pump 22, and the generator motor 31 are coupled to the output shaft of the engine 11 via the power transfer 6. However, the present invention is not limited to this configuration and the hydraulic work machine may be configured, for example, such that the hydraulic pump 21, the pilot pump 22, and the generator motor 31 are coupled to the output shaft of the engine 11 in series.

DESCRIPTION OF REFERENCE CHARACTERS

1: Engine system
2: Hydraulic system
3: Generator-motor system
4: Control system
6: Power transfer
11: Engine
12: Engine control dial
13: Engine controller
14: Electronic governor
15: Engine speed sensor
21: Hydraulic pump
21a: Displacement varying mechanism
22: Pilot pump
23: Control valve
24a to 24h: Hydraulic actuator
25a to 25h: Operation device
26: Gate lock lever
27: Pump regulator
28: Gate lock sensor
29: Gate lock valve
31: Generator motor
32: Inverter
33: Battery (electric storage device)
34: Battery controller
41: Forced charging switch
42: Torque reduction control solenoid valve
43: Work machine monitor
46: Machine controller
46a: Output power assist control/charging control section (first controller section)
46b: Forced charging control section (second controller section)
101: Lower track structure
102: Upper swing structure
103: Swing post
104: Front work implement
105: Track frame
106: Excavation blade
107: Swing structure
108: Cabin (operation room)
111: Boom
112: Arm
113: Bucket

The invention claimed is:
1. A hybrid work machine comprising:
an engine;
a hydraulic pump driven by the engine;
a plurality of hydraulic actuators driven by a hydraulic fluid delivered from the hydraulic pump;
a plurality of operation devices provided within an operation room and issuing commands regarding operations of the plurality of hydraulic actuators;
an engine control dial that designates a target engine speed of the engine;
an engine controller that controls an electronic governor to control a fuel injection amount of the engine in such a manner that an engine speed of the engine is changed in response to the target engine speed of the engine designated by the engine control dial and an output power torque of the engine increases as a load torque of the engine increases;

a generator motor coupled to the engine;

an electric storage device that supplies and receives electric power to and from the generator motor; and a machine controller configured to actuate the generator motor as an electric motor by supplying the electric power from the electric storage device to the generator motor to perform output power assist; and to actuate the generator motor as a generator by driving the generator motor to rotate by the engine to charge the electric storage device, wherein the hydraulic work machine further comprises:

a gate lock lever that is provided within the operation room, and that is selectively operated to one of a lock position at which the operations of the plurality of hydraulic actuators by the plurality of operation devices are disabled and an unlock position at which the operations of the plurality of hydraulic actuators by the plurality of operation devices are enabled;

a forced charging switch operated by an operator when a charging rate of the electric storage device falls to be lower than a preset charging rate to perform a forced charging control; and a work machine monitor that notifies the operator that a charging rate of the electric storage device falls to be lower than the preset charging rate;

wherein the machine controller is further configured to increase the target engine speed of the engine from a low idle engine speed to an engine speed suited for forced charging and actuate the generator motor as the generator in this state to forcedly charge the electric storage device when the forced charging switch is operated in a state in which the gate lock lever is operated to the lock position and the engine control dial designates the low idle engine speed as the target engine speed.

2. The hybrid work machine according to claim 1, wherein the machine controller is configured to set the target engine speed of the engine at a low fuel consumption engine speed at which a fuel consumption is smaller than at the low idle engine speed, as the engine speed suited for the forced charging.

3. The hybrid work machine according to claim 2, wherein the machine controller is configured to stop actuating the generator motor as the generator, end forced charging of the electric storage device, and reduce the target engine speed of the engine from the low fuel consumption engine speed to the low idle engine speed when a charge amount of the electric storage device increases to a preset appropriate charging rate that does not adversely influence continuous work.

4. The hybrid work machine according to claim 2, wherein the machine controller is configured to stop actuating the generator motor as the generator, end forced charging of the electric storage device, and reduce the target engine speed of the engine from the low fuel consumption engine speed to the low idle engine speed when the gate lock lever is operated to the unlock position while the forced charging is ongoing, or when the engine speed designation device is operated to change the target engine speed of the engine.

5. The hybrid work machine according to claim 1, wherein the machine controller is configured to exercise emergency charging control in such a manner as to exercise engine speed reduction control to reduce the target engine speed of the engine and a torque reduction control to reduce a maximum absorption torque of the hydraulic pump and to actuate the generator motor as a generator using an extra torque generated in the engine by the engine speed reduction control and the torque reduction control to charge the electric storage device when the charging rate of the electric storage device falls to be lower than the critical charging rate, and is configured to disable the emergency charging control when the gate lock lever is operated to the lock position, when the engine speed designation device designates the low idle engine speed, or when the gate lock lever is operated to the lock position and the engine speed designation device designates the low idle engine speed.

* * * * *